United States Patent
Gibbs et al.

(10) Patent No.: US 6,169,725 B1
(45) Date of Patent: Jan. 2, 2001

(54) APPARATUS AND METHOD FOR RESTORATION OF INTERNAL CONNECTIONS IN A HOME AUDIO/VIDEO SYSTEM

(75) Inventors: Simon J. Gibbs, San Jose; Feng Zou, Milpitas; Rodger J. Lea, San Jose, all of CA (US)

(73) Assignees: Sony Corporation of Japan, Tokyo (JP); Sony Electronics, Inc., Park Ridge, NJ (US)

( * ) Notice: Under 35 U.S.C. 154(b), the term of this patent shall be extended for 0 days.

(21) Appl. No.: 09/183,161

(22) Filed: Oct. 30, 1998

(51) Int. Cl.$^7$ ........................................... H04J 3/16
(52) U.S. Cl. .................. 370/216; 370/259; 370/431; 364/183; 364/188; 348/552
(58) Field of Search .................. 340/286.06, 286.07, 340/286.08, 286.09; 348/552; 364/180, 183, 188, 191; 370/216, 235, 249, 259, 431

(56) References Cited

U.S. PATENT DOCUMENTS

| | | | |
|---|---|---|---|
| 4,332,980 | * | 6/1982 | Reynolds et al. ................. 370/259 |
| 5,086,385 | * | 2/1992 | Launey et al. ................... 364/188 |
| 5,867,223 | * | 2/1999 | Schindler et al. ................ 348/552 |

* cited by examiner

Primary Examiner—Douglas W. Olms
Assistant Examiner—Shick Hom
(74) Attorney, Agent, or Firm—Wagner, Murabito & Hao LLP

(57) ABSTRACT

An apparatus and method for the restoration of internal connections of consumer electronic devices in a home audio/video network. The present invention automatically maintains and manages the internal connections for each of the devices on the network. In the currently preferred embodiment, each internal connection is labeled according to its status (e.g., active or inactive) and/or condition (e.g., network compliancy). Whenever a new device is added to or an old device is removed from the network, a network reset is initiated. The network reset causes a device control module to terminate its normal mode of operation and enter into a "restore" mode of operation. During the restore mode, the device control module accepts connection information sent by the various stream managers of those devices currently coupled to the network. Based on this information, the device control module updates the label data for each of the internal connections. A set of rules is applied to the labels to determine whether a connection is allowed to be made by the stream manager or whether a connection is allowed to be disconnected by the stream manager. The device control manager enters back to its normal mode of operation either after all stream managers have reported or one second has elapsed.

17 Claims, 9 Drawing Sheets

APPARATUS AND METHOD FOR RESTORATION OF INTERNAL CONNECTIONS IN A HOME AUDIO/VIDEO SYSTEM

FIELD OF THE INVENTION

The present invention relates to audio/video systems. More particularly, the present invention pertains to an apparatus and method for the restoration of internal connections in a home audio/video system.

BACKGROUND OF THE INVENTION

A typical home audiovisual equipment set up includes a number of components. For example, a tuner, a radio receiver, a CD player, a pair of speakers, a television, a VCR, a tape deck, etc. Each of these components are connected to each other via a set of wires. One component is usually the central component of the home audiovisual system. This is usually the tuner, or the receiver. The tuner has a number of specific inputs for coupling the other components. The tuner has a corresponding number of control buttons or control switches which provide a limited degree of controllability and interoperability for the components. The control buttons and control switches are usually located on the front of the tuner. In many cases, some, or all, of these buttons and switches are duplicated on a hand held remote control unit. A user controls the home audiovisual system by manipulating the buttons and switches on the front of the tuner, or alternatively, manipulating buttons on the hand held remote control unit. This conventional home audiovisual system paradigm has become quite popular.

However, as the number of consumer electronics devices for the home audiovisual system have grown and as the sophistication and capabilities of these devices have increased, a number of problems with the conventional paradigm have emerged. One such problem relates to the management of the connections between the various components. Often, users will upgrade old equipment with a newer model according to the users' budgets and tastes. Other times, users will add brand new devices which hitherto had not been available. In any case, the user has to somehow rewire the interconnections so as to accommodate the new devices. In the past, making the proper connections was trivial. The newly purchased devices are simply "plugged" into their home audiovisual systems according to the instructions provided. The new device (e.g., a DVD player) is simply plugged into the system alongside the pre-existing devices (e.g., television, stereo system, etc.). Typically, the new device is plugged into an open input on the back of the tuner, or some other device couple to the tuner. But with the introduction of highly sophisticated digital devices coming to market (e.g., digital cameras, set-top boxes, personal computers, color printers, cable modems, digital camcorders, digital audio tape recorders, satellite transceivers, etc.), knowing how to connect the various devices has now become a fairly sophisticated and quite challenging endeavor for the casual consumer.

There are other factors which further complicate how devices are to be connected. First, there may be one or more internal connections within a specific device which have to be made in order to fully realize that device's capabilities. When one device is coupled to another device through a cable or wire, the electronics and various components within each of these devices must have the proper connections in order to share processing resources and/or audio-visual data streams. For example, the infamous "flashing clock on the VCR" can be solved by having the VCR set its clock to that of another device on the home network (e.g., a digital TV receiver which obtains time signals via a digital satellite or CATV broadcast). In this example, the receiver in the TV would have to receive and demodulate the signal containing the current time information, pass the time information to a transmitter within the TV which forwards this time information to the VCR over a wire or cable; a receiver within the VCR picks up the time information and forwards it to the processor which then sets the clock display according to the received time information. In, Home Audio/Visual (HAVI), the setting of a clock on one component to that on another is accomplished by messaging rather than isochronous connections (these are used for streaming-ic A/V stream). Consequently, not only does one have to make the proper external connections between devices, but the appropriate connections within each of the devices must also be made.

Another factor which makes it difficult for establishing a home audio-video system is that devices are often incompatible. Consumer electronic devices from one manufacturer often have different electrical characteristics, interfaces, and standards than that of similar devices from another manufacturer. For example, a tuner made by one manufacturer may not properly couple with a television set sold by another manufacturer. In addition, were one device is much newer than another device additional incompatibilities may exist. For example, a new device might incorporate hardware (e.g., specific inputs and outputs) which enables more sophisticated remote control functions. This hardware may be unusable with older devices within the system. Or, for example, older tuners may lack suitable inputs and internal components/connections for some newer devices (e.g., minidisc players, VCRs, etc.), or may lack enough inputs for all devices of the system. Along these same lines, another problem is the lack of functional support for differing devices within an audio/visual system. For example, even though a television may support advanced sound formats (e.g., surround sound, stereo, etc.), if an older less capable tuner does not support such functionality, the benefits of the advanced sound formats can be lost.

While the emergence of networking and interface technology (e.g., IEEE 1394 serial communication bus and the wide spread adoption of digital systems) offers prospects for correcting these problems, there is still no coherent, open, extensible architecture which can provide for intelligent, self configuring, easily extensible devices or AV systems. For example, while various solutions involving the use of IEEE 1394 as the basis of an AV system, none provide for the extensibility of the AV system over its life time, as new devices are added whose capabilities and features are unknown. None of these systems guarantee that all devices can be seemlessly intercoupled, communicated with and controlled and enjoyed by the user.

Thus, there exists a need for an apparatus and method which automatically monitors and establishes the proper interrial/external connections in response to changes made to a home audio/visual system. The present provides a novel solution to this problem which is transparent to the user and requires minimal effort and knowledge on the part of the user.

SUMMARY OF THE INVENTION

The present invention pertains to an apparatus and method for the restoration of internal connections in a home audio/video system. When several consumer electronic devices are coupled together, they can share their respective resources (e.g., processing, data, memory, etc.). This imparts enhanced functionality, flexibility, and capability with minimal cost. However, in order to achieve this, the proper connections must be made. Not only must each of the devices be physically connected together by wires or cables, but the proper connections between each of the internal components residing within the devices must also be made. When a device is removed from the system, it might have been using a component residing within a different device. With the removal of the device, the connection within the other device need not be made; that connection may now be dropped. Likewise, when a new device is added to the network, it might advantageously utilize a component or data from a pre-existing device on the network. This would entail making the proper internal connections within the new device, coupling the new device to the network, and making the proper internal connections within the pre-existing device.

The present invention automatically maintains and manages the internal connections for each of the devices on the network. In the currently preferred embodiment, each internal connection is labeled according to its status (e.g., active or inactive) and/or condition (e.g., network compliancy). Whenever a new device is added to or an old device is removed from the network, a network reset is initiated. The network reset causes a device control module to terminate its normal mode of operation and enter into a "restore" mode of operation. During the restore mode, the device control module accepts connection information sent by the various stream managers of those devices currently coupled to the network. Based on this information, the device control module updates the label data for each of the internal connections. A set of rules is applied to the labels to determine whether a connection is allowed to be made by the stream manager or whether a connection is allowed to be disconnected by the stream manager. The device control manager enters back to its normal mode of operation either after all stream managers have reported or one second has elapsed.

BRIEF DESCRIPTION OF THE DRAWINGS

The operation of this invention can be best visualized by reference to the drawings.

DETAILED DESCRIPTION

Figure 1:
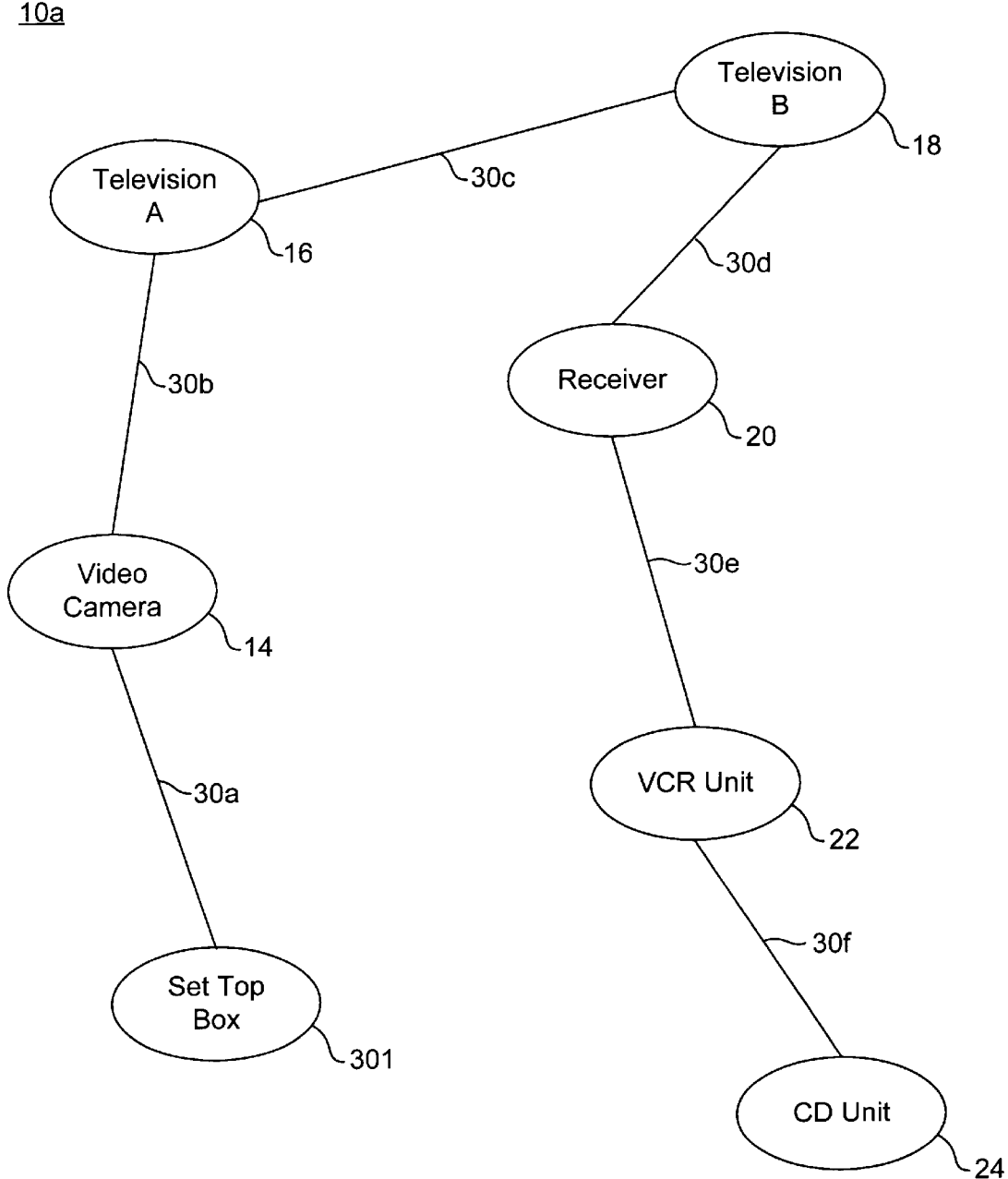
FIG. 1 shows a HAVI network 10a upon which the present invention may be practiced.

An apparatus and method for the restoration of internal connections in a home audio/video system is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Architecture Overview

The present invention pertains to an apparatus and method whereby devices are easily added, removed, and/or replaced in a home audio/visual (HAVI) system. HAVI is a particular example of a home audio/visual system. The most basic components of a system in accordance with the present invention are: a home audio/video (AV) interoperability architecture, a series of home AV interoperability interfaces, and a home AV network. The home AV interoperability architecture is a broad, over arching term encompassing the physical network and the controlling programming interfaces. Interoperability interfaces is a term used to describe the interactions and interfaces of the components of the AV architecture. The interoperability interfaces provide a software architecture which allows new devices to be integrated into the network and provide their services in a seamless manner. The home AV network is the term used to describe the physical network and its topology.

It should be noted that the HAVI architecture is an open, platform independent, architecturally-neutral network that allows consumer electronics manufacturers and producers to provide inter-operable appliances. It can be implemented on different hardware/software platforms and does not include features that are unique to any one platform. The interoperability interfaces of the HAVI architecture are extensible and can be added to, modified and advanced as market requirements and technology change. They provide the infrastructure to control the routing and processing of isochronous and time-sensitive data (e.g., such as audio and video content). Specifically, the HAVI architecture provides: an execution environment supporting the visual representation and control of appliances; application and system services; and communication mechanisms for extending the environment dynamically through plug and play or otherwise.

It should be noted that the HAVI architecture supports legacy appliances (e.g., appliances that already exist and are available to users). This is important since the transition to more intelligent net worked appliances is going to be slow. Most manufacturers will not suddenly begin producing only "intelligent" appliances and most consumers will not quickly begin replacing all of their existing appliances. There are two classes of legacy appliances. A first class includes "one-way" or unacknowledged control appliances. A second class includes controllable "two-way" appliances. Examples of one-way appliances are audio/video components controlled by infrared commands of a hand held remote. Two-way appliances provide confirmation of command execution, status and error reporting. Examples of two-way appliances include the recent introduction of well known IEEE 1394 enabled digital cameras.

It should be noted that the HAVI network also provides support to accommodate future appliances and protocols through a write-once, run-everywhere common language. In accordance with the present invention, each appliance includes within it self-describing information concerning the user interface and the device control that can be used by an external controller. This information is specified as programs in the common language.

As described below, the underlying structure for such a network consists of set of interconnected clusters of appliances. Typically, there will be several clusters in the home, with one per floor, or per room. Each cluster will work as a set of interconnected devices to provide a set of services to users. Often, one device will act as a controller for a set of other devices. However, the architecture is sufficiently flexible to also allow a home to consist of a single cluster with no master controller. For example, an intelligent television in the family room of a user's home might function as the controller for a number of interconnected appliances. Each of the controlled appliances would have self describing data and possibly some associated control code. When these appliances are first connected, the controller obtains the user interface and the control program for the appliance. An icon representing the appliance may then appear on the television screen, and manipulating the icon may cause elements of the control program to actuate the represented appliance or appliances in prescribed ways. The exception to this model are legacy devices which will have neither self describing data or control code. For addition descriptions and related art regarding self describing data, the reader is referred to Lea, "A HOME AUDIO/VIDEO NETWORK WITH UPDATABLE DEVICE CONTROL MODULES, Ser. No. 09/003, 112, filed on Jan. 6, 1998, which is incorporated herein by reference in its entirety.

It should be noted that the HAVI network of the present invention supports "Plug and Play" consumer appliances are easy to install, and provide a significant portion of their value to the consumer without any action on the user's part, beyond physically connecting the cables. This is in distinction to existing appliances that require configuration to provide some major portion of their functionality. The goal is to offer 'hot' plug and play (not requiring the user to switch off appliances) where the connection method supports it safely and reliably.

In accordance with the present invention, an appliance configures itself, and integrates into a system-wide "look and feel" user interface, without user intervention. Low-level communication services provide notification when a new appliance is identified on the AV network. While there will often be settings the user may change to suit his or her preferences, the appliance does not require the user to do so in order to offer basic functionality.

It should also be noted that the HAVI network of the present invention is flexible and supports multiple user interfaces, adapting to both the user's needs and the manufacturers need for brand differentiation. In the AV network, protocols scale gracefully from very resource-which, intelligent PC-like appliances to "dumb", resource starved appliances (e.g., a coffee maker or thermostat). To achieve this, the AV architecture allows low-end appliances to use the resources of more intelligent appliances in well-defined ways. In a similar manner, the AV architecture allows the specification of aggregate appliances where an abstract appliance is created from a logical collection of several lower-level appliances.

And additionally, it should be noted that the HAVI network of the present invention supports existing standards. The HAVI network is complementary to several existing, well known, industry standards and technologies including: CEBus; Home Plug and Play; EHSI; VESA; Home Network, DAVIC, CoMMeND, Lonworks, USB, IEEE 1394, etc. Accordingly, one goal of the present invention is to provide an infrastructure into which existing devices can fit.

System Overview

With reference now to FIG. 1, a HAVI network 10a upon which the present invention may be practiced is shown. The HAVI architecture supports a wide range of devices including intelligent receiver/decoders (IRDs), for example, the set top box 301, digital video tape records (DVTRs), video cassette recorders (VCRs), personal computers (PCs), digital video disk players (DVDs), etc., communicating via a common messaging system. FIG. 1 illustrates the physical port-to-port connecting configuration 10a of an exemplary HAVI network. CE devices ("devices") 12–24 are shown connected together with bus segments 30a–30f. In one embodiment of HAVI, the IEEE 1394 serial communication bus standard is used as a platform to provide the common messaging system.

Figure 2:
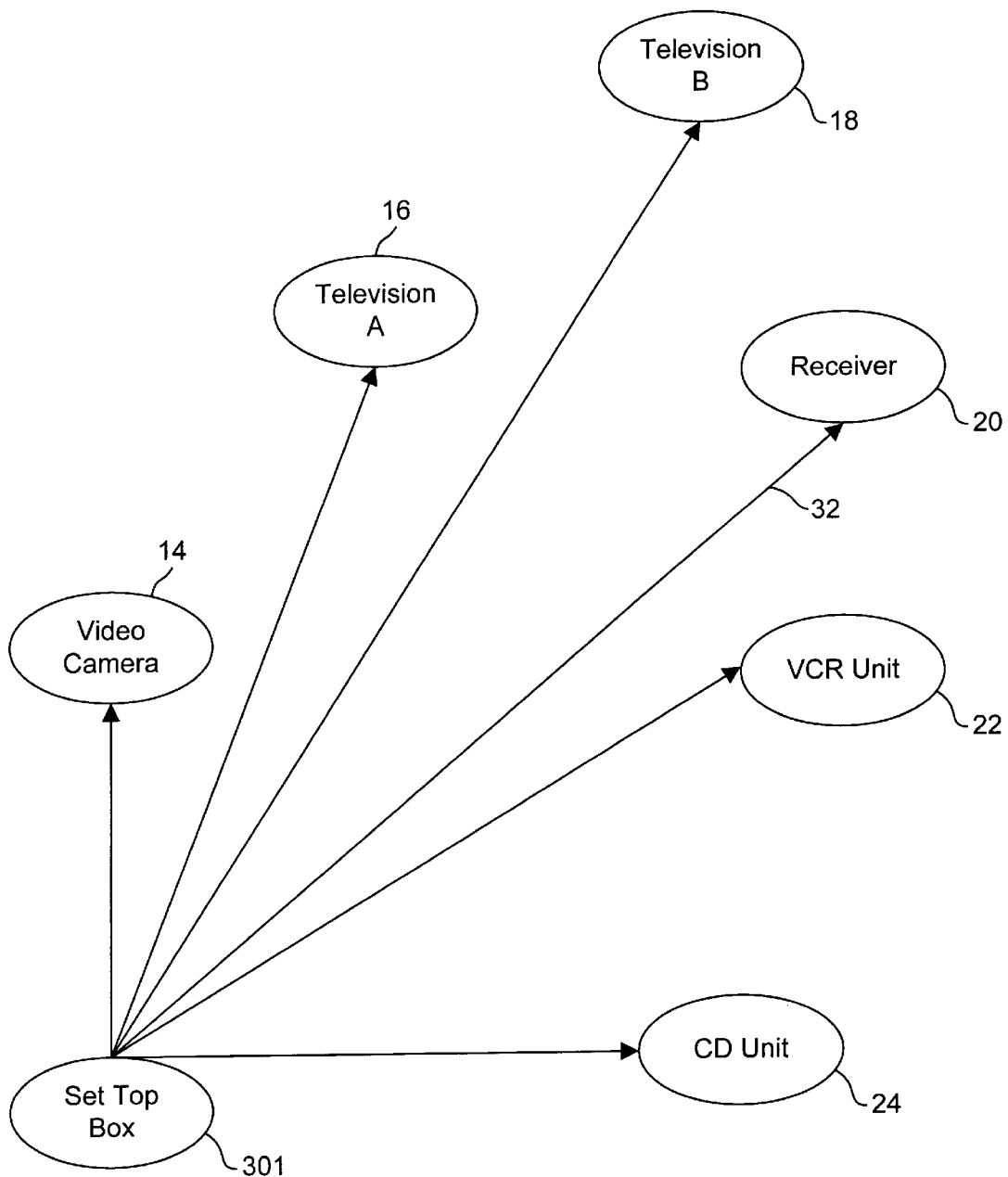
FIG. 2 illustrates a logical bus configuration of the HAVI network.

FIG. 2 illustrates a logical bus configuration 10b of the HAVI network of FIG. 1. As shown in FIG. 2, all of the devices 12–24 of the HAVI network can be viewed as logically coupled to a common IEEE 1394 serial communication bus 30. Within this bus configuration 10b, peer-to-peer device communication is supported. Any device (having appropriate capabilities) can send or receive communication packets from any other device in the HAVI network. In the example of FIG. 2, the set-top-box (e.g., an IRD) can receive messages from or generate messages to any of the other devices 14–24 of the HAVI network.

Referring still to FIGS. 1 and 2, as described above, the interoperability model in HAVI provides for the following: 1) support for existing devices; 2) a default control model; 3) a means to extend the default control model when new devices or functionality is brought to market; and 4) a common means for device representation (e.g., graphics user interfaces). To achieve the above, the HAVI architecture defines three types of nodes in the home network: Full AV nodes (FAV), Intermediate AV nodes (IAV) and Base AV nodes (BAV).

A Full AV node is a device that contains a complete instance of the AV software model (described in detail below). This type of node generally has a richer set of resources and is capable of supporting a complex software environment. The primary distinguishing feature of a FAV is that it is able to take control responsibility for less sophisticated devices and does this by loading a control module, usually from the less sophisticated device, and executing it locally. Examples of such nodes would be Set Top Boxes (e.g., set top box 301), Smart TV's, general purpose home control devices, or even Home PC's.

Intermediate AV nodes are generally lower cost devices that have limited resources. They do not provide an execution environment for uploaded control modules and so can not act as master controllers within the home network. Because they have limited resources, they can access remote resources in one of two ways: by working with other IAV devices who provide some capability they lack, or by using an FAV node which supports a control module to control them. In this second mode of operation they rely on full AV nodes to provide such facilities as a display device, general purpose compute resources and some overall control framework. This allows Full AV devices to bind a variety of intermediate AV devices together to provide a service or abstraction to the user.

Base nodes are nodes that are neither FAV or IAV nodes. These are two generic types: Legacy base nodes, and other base nodes. Legacy base nodes are devices that were built before the advent of the HAVI architecture. These devices often use proprietary protocols for their control, and quite frequently have a simple, well defined, control only protocol. Such devices can work in the HAVI network but require that a Full AV node act as a gateway. Communication between a Full or Intermediate AV node and legacy devices requires that the Home AV commands used in the HAVI architecture be translated to and from the legacy command protocol. Other base nodes are devices that, for business or resource reasons, choose to implement future proof behavior using uploadable control software and do not carry any of the HAVI architecture or the message communication system. These devices will be controlled by an FAV node with a private command protocol between FAV and BAV node.

With the exception of legacy nodes, each node has, as a minimum, enough functionality to allow it to communicate with other nodes in the system. During the course of interaction, nodes exchange control and data information to enable devices to inter-operate and will do so in a peer to peer fashion. This ensures that, at the communication level, no one device is required to act as a master or controller for the system. However, it also allows a logical master or controller to impose a control structure on the basic peer to peer communication model. Services in the HAVI network are provided by one or more nodes communicating amongst themselves to deliver a service to user or an application. Where it is necessary for a node to interact with a user, then the node negotiates with other nodes to access and use a display device.

Additionally, it should be appreciated that a distinction is made between Logical and Physical nodes. A good example of this distinction can be found in a normal TV set. Although the TV set is gene(rally one physical box, it contains several functional components, e.g. the tuner, audio output etc. From the system point of view a physical node is an addressable peer node in the system. If the TV is constructed in such a way that its individual functional components are individually addressable, then it is logically one node and physically several nodes. Conversely, if it is constructed to have one addressable entity, then it is both a single logical node and a single physical node.

The IAV devices and FAV devices communicate by sending messages over the home network using a generic message passing system. When new devices join the home network, they are recognized and added to a global name database (registry). The registry holds information about their characteristics and provides a reference to a handler for that device. Other devices and services are able to query the registry to locate a device and then using the handler, can interact with the device. For additional descriptions and related art regarding the communication and identification processes of the present invention, the reader is referred to Ogino, et al., "METHOD AND SYSTEM FOR PROVIDING A DEVICE IDENTIFICATION MECHANISM WITHIN A CONSUMER AUDIO/VIDEO NETWORK", a U.S. Pat. No. 6,038,625 filed on Jan. 6, 1998, which is incorporated herein by reference in its entirety.

When a device is initially added to the home network, the system queries the device to ascertain its characteristics and capabilities. Once a device's characteristics are known, the architecture provides two methods of controlling it. The first method, level 1 interoperability uses a predefined message set. All IAV and FAV nodes can use this command set to access and control other devices (BAV nodes, because they are deployed before the architecture was defined, are controlled using legacy protocols). The provides a default level of control. The FAV nodes act as control nodes and create a local representation of the IAV node, known as a device control module (DCM) that provides an API used to send control commands to the device.

Level 2 interoperability within HAVI goes farther and supports future added functionality and new devices. To achieve this, a particular device can carry within its ROM, an uploadable DCM that is uploaded from the IAV device, to the FAV device and replaces the default DCNI for the particular device. This override DCM not only contains the basic level 1 command set for the particular device but also includes vendor specific commands to control advanced features of the device. The model allows the device to inform another about its particular functionality. Since the override DCM may be loaded onto any vendor's PAV, the format of the DCM is architecture-neutral.

To allow one device to discover the capabilities of another device and to determine which command set to use with that devices, a standard device description structure is provided called the self describing data (SDD) structure. The SDD data structure is extensible. It can be a small number of bytes describing the device type, e.g., TV, or VTR, etc. Alternatively, the SDD data structure can be a more complex structure also defining the override DCM and a graphical representation of the device. The graphical representation within the SDD data structure allows an FAV node to present a pictorial representation of the devices in the home network to users. By defining the graphical representation in a sufficiently generic manner, a device's SDD graphical data can be used in any vendor's product to display a user interface for that device. This provides an enhanced level of vendor interoperability and also allows a vendor to differentiate a product while maintaining within the general look and feel of the display device. This enables a control device (the FAV node) to present a general control user interface for all devices in the home network, irrespective of the differences in type and vendor.

As described above, Legacy devices are devices that were built before the HAVI architecture or devices that select not to use HAVI. HAVI supports Legacy devices by providing Legacy DCMs to provide protocol conversions for Legacy devices. These Legacy DCMs can contain sufficient knowledge to allow them to support an existing 1 or 2 way control protocol and provide a specific control interface to the devices that conform to HAVI. A legacy DCM acts as a bridge between the Legacy and HAVI devices. This approach allows HAVI also to interact with any future device control protocols such as protocols being used for home energy management or security.

It should be appreciated that the communications hardware and protocols used by the HAVI architecture are non-specific. The HAVI architecture is readily suited to the incorporation and use of any one of several communications mediums, with the simple requirement that the medium provides a generic communication mechanism that supports the HAVI interfaces. The basic model assumed is one of a logical communications back plane (e.g., IEEE 1394). All AV devices are assumed to be connected to this back plane, and can locate and communicate with all other AV devices, as shown in FIG. 1. In a physical setting, it is likely that this logical back plane will consist of more than one physical communication medium. It is further assumed that multiple protocols may be in use on different physical media. The Home AV architecture abstracts above all of this and presents a generic model of communicating nodes. It will provide a mechanism above the Transport layer (functionally like a socket) to ensure network transparency. This mechanism can be described as "reliable, ordered datagram service" which will provide all fragmentation and re-assembly. Accordingly, the present invention supports each and every physical bus, such that an application need not care which physical transport it is using. However, with the familiarity of IEEE 1394 in the electronics industry, features of the present embodiment are illustrated and described in view of functioning with IEEE 1394. Other buses such as CEBus and USB may not require all the same features.

Figure 3:
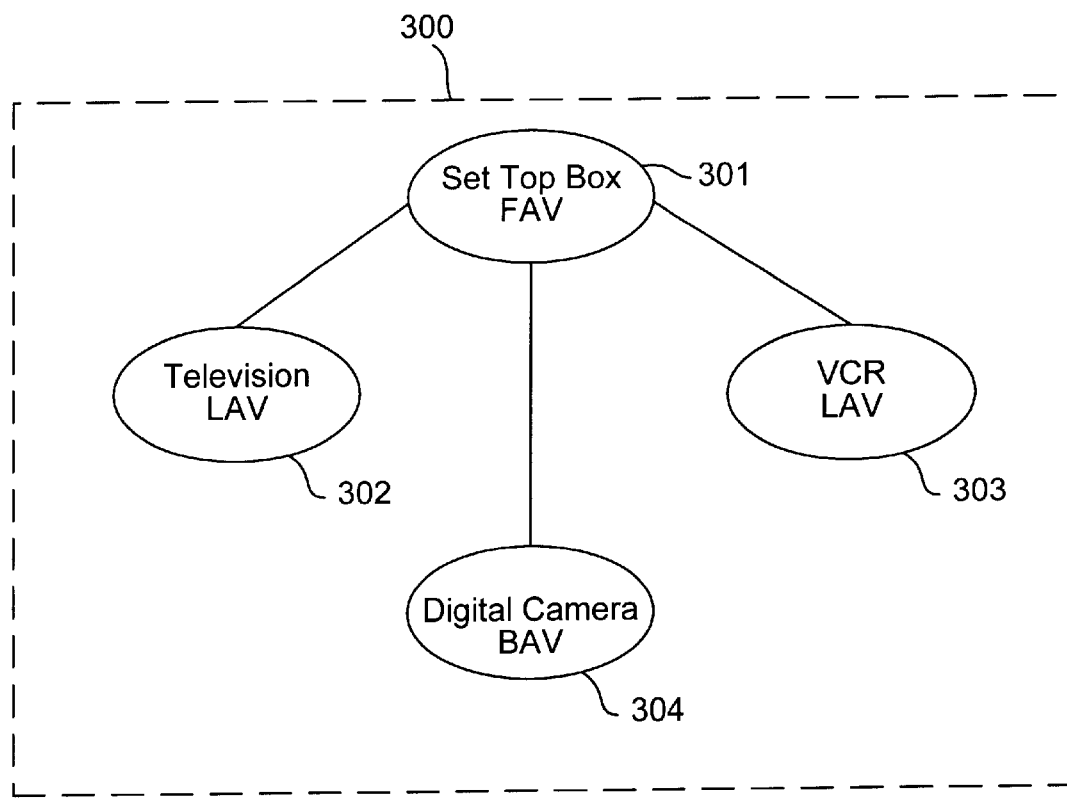
FIG. 3 shows a single FAV cluster HAVI network in accordance with one embodiment of the present invention.

FIG. 3 shows a single FAV cluster HAVI network 300 in accordance with one embodiment of the present invention. HAVI network 300 includes an FAV 301 (e.g., a set top box) respectively coupled to a first LAV 302 (e.g., a television) a second LAV 303 (e.g., a VCR) and a BAV 304 (e.g., a digital camera). In HAVI network 300, FAV 301 controls Legacy and Base AV devices (e.g., devices 302–304), providing cluster-wide services.

Computer System Platform

Figure 4:
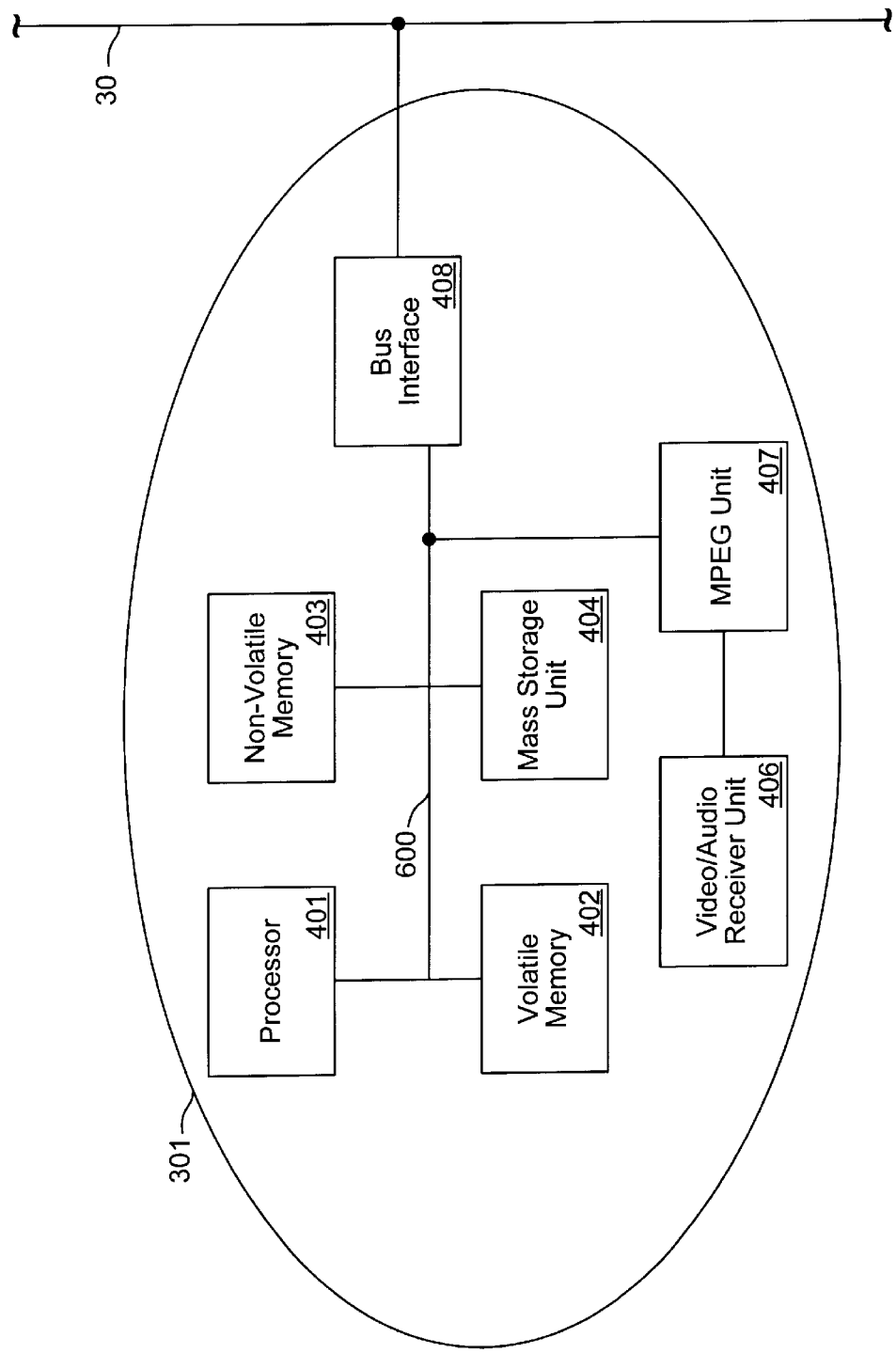
FIG. 4 shows a diagram of a set top box in accordance with one embodiment of the present invention.

With reference now to FIG. 4, a diagram of a set top box 301 in accordance with one embodiment of the present invention is shown. As described above, any consumer electronics device can be a FAV and thereby provide a computer system platform for HAVI software. For instance, the set-top-box 301 device of the exemplary HAVI network contains special components that provide an operation platform for software components of the HAVI architecture which are described below. Specifically, aspects of the present invention, described below, are discussed in terms of steps executed on a computer system. Although a variety of different computer systems can be used with the present invention, an exemplary general purpose computer system is shown in the set-top-box of FIG. 4.

Set-top-box 301 of FIG. 4, in addition to having a video/audio receiver (decoder) unit 406 and MPEG unit 407 also includes an address/data bus 400 for communicating information, one or more central processors 401 coupled with the bus for processing information and instructions, a volatile memory 402 (e.g., random access memory RAM) couple(d with the bus 400 for storing information and instructions for the central processor 401 and a non-volatile memory 403 (e.g., read only memory ROM) coupled with the bus 400 for storing static information and instructions for the processor 401. Set-top-box 301 can also optionally include a data storage device 404 ("disk subsystem") such as a magnetic or optical disk and disk drive coupled with the bus 400 for storing information and instructions. Also included in the set-top-box 301 is a bus interface unit 408 for interfacing with the local bus 30 (e.g., an IEEE 1394 serial bus). Set-top-box 301 can operate under a variety of different operating systems (e.g., Windows operating system, DOS operating system, Macintosh O/S), but in the present embodiment the Aperios operating system is used.

Software Architecture

Figure 5:
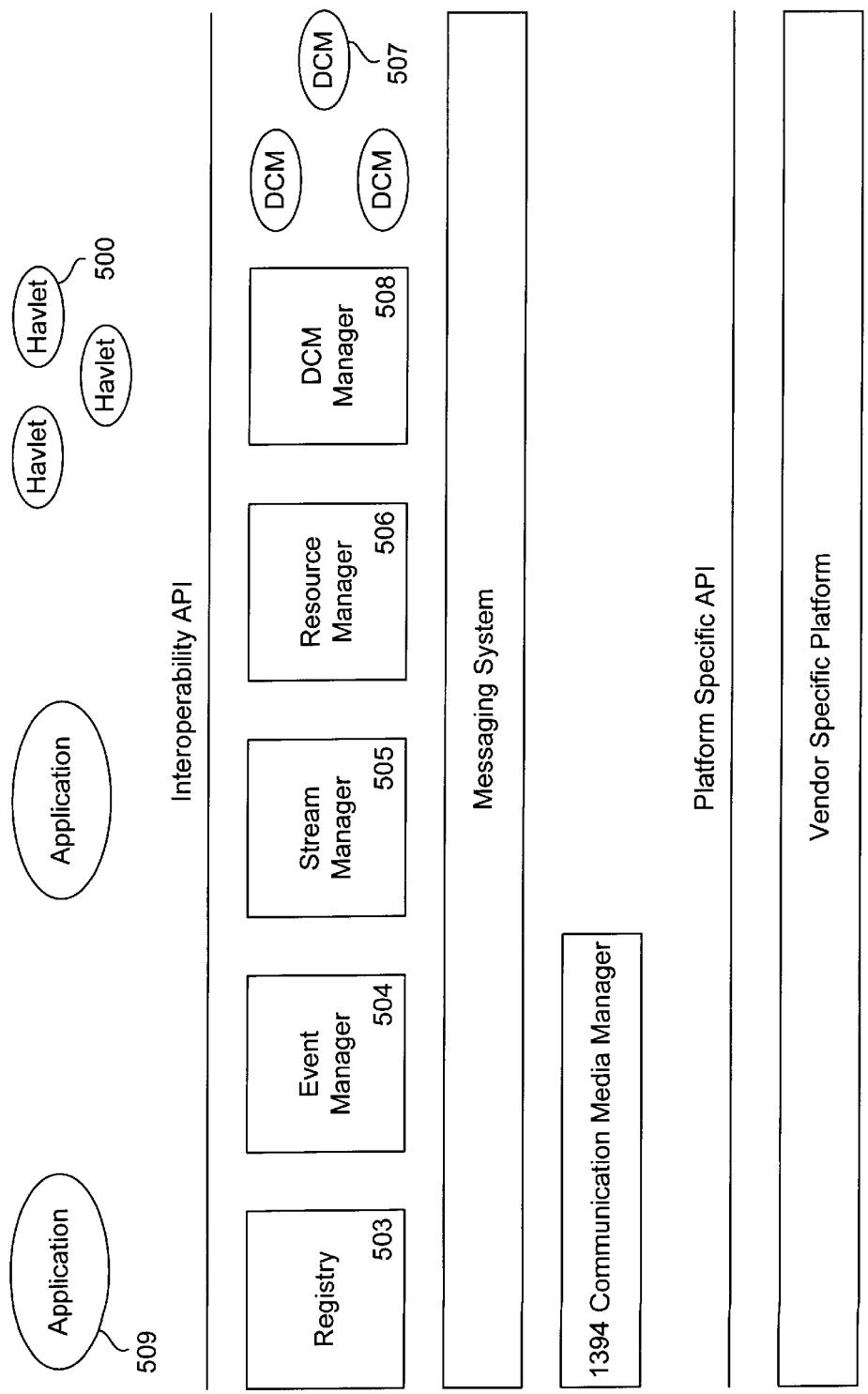
FIG. 5 shows a logical block diagram of one embodiment of the HAVI architecture.

Referring now to FIG. 5, a logical block diagram 500 of one embodiment of the HAVI architecture is shown. FIG. 5 shows an overall HAVI architecture in accordance with the present invention. The components shown in diagram 500 are as follows:

1394 Communication Media Manager 501—allows other elements to perform asynchronous and isochronous communication over 1394.

Messaging System 502—responsible for passing messages between elements.

Registry 503—serves as a directory service, allows any object to locate another object on the home network.

Event Manager 504—serves as an event delivery service. An event is the change in state of an object or of the home network.

Stream Manager 505—responsible for managing real-time transfer of AV and other media between functional components.

Resource Manager 506—facilitates sharing of resources and scheduling of actions.

Device Control Module (DCM) 507—a software element used to control a device. DCMs are obtained from DCM code units. Within a DCM code unit are code for the DCM itself plus code for Functional Component Modules (FCMs) for each functional component within the device. In addition a DCM code unit may include a havlet allowing user control of the device and its functional components.

DCM Manager 508—responsible for installing and removing DCM coded units on FAV and IAV devices.

Application 509—a software element that uses other HAVi software elements to provide specific services. An application may originate from native (proprietary) code on the hosting device or from Application Modules in Java bytecode provided by (third party) application writers.

Figure 6:
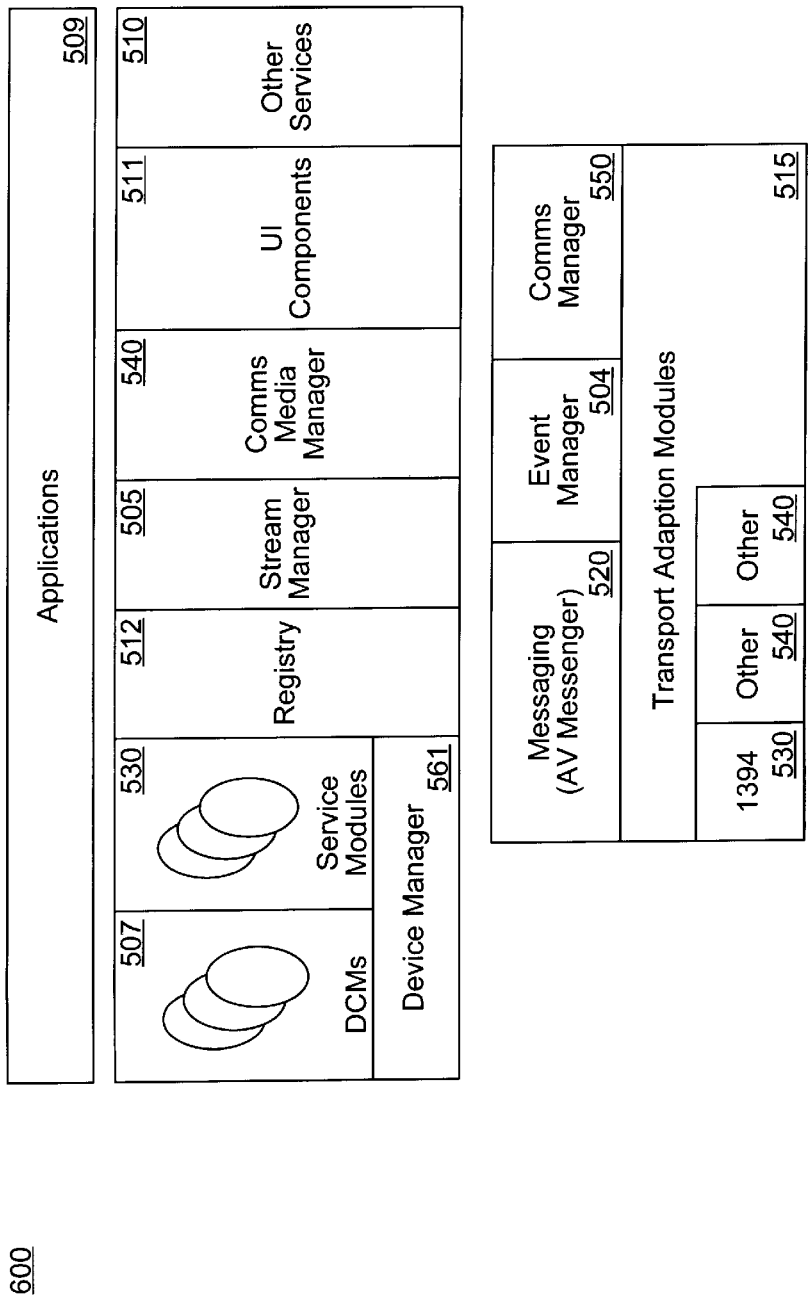
FIG. 6 shows a layered logic diagram of one HAVI architecture in accordance with the present invention.

Referring now to FIG. 6, a layered logic diagram 600 of one HAVI architecture in accordance with the present invention is shown. The components shown in diagram 600 are similar to those shown in diagram 700, however, diagram 600 is organized such that high level processes are on top (e.g., applications 601) with respect to lower level processes on the bottom (e.g., 1394 module 630). Diagram 600 also depicts other services 610, transportation adaptation modules 615, and other modules 640.

As described above, the overall HAVI architecture can be shown as communications components and service components. Applications 509, at the highest level in the architecture use the services and the communication components (e.g., DCMs 507, service modules 530, etc.). In turn, a number of the service components (e.g., service modules 530, DCM 507, etc.) will use the underlying communications components (e.g., messaging 520, transportation adaptation modules 515, etc.). For example, in the case of one of applications 509 requesting, via the registry 512, the handle for a DVTR (digital video tape recorder) device, and then sending a play command to the device. As described above, components in the HAVI architecture communicate using the underlying messaging system, i.e., the modules use message passing.

Internal Connection Restorations

Figure 7:
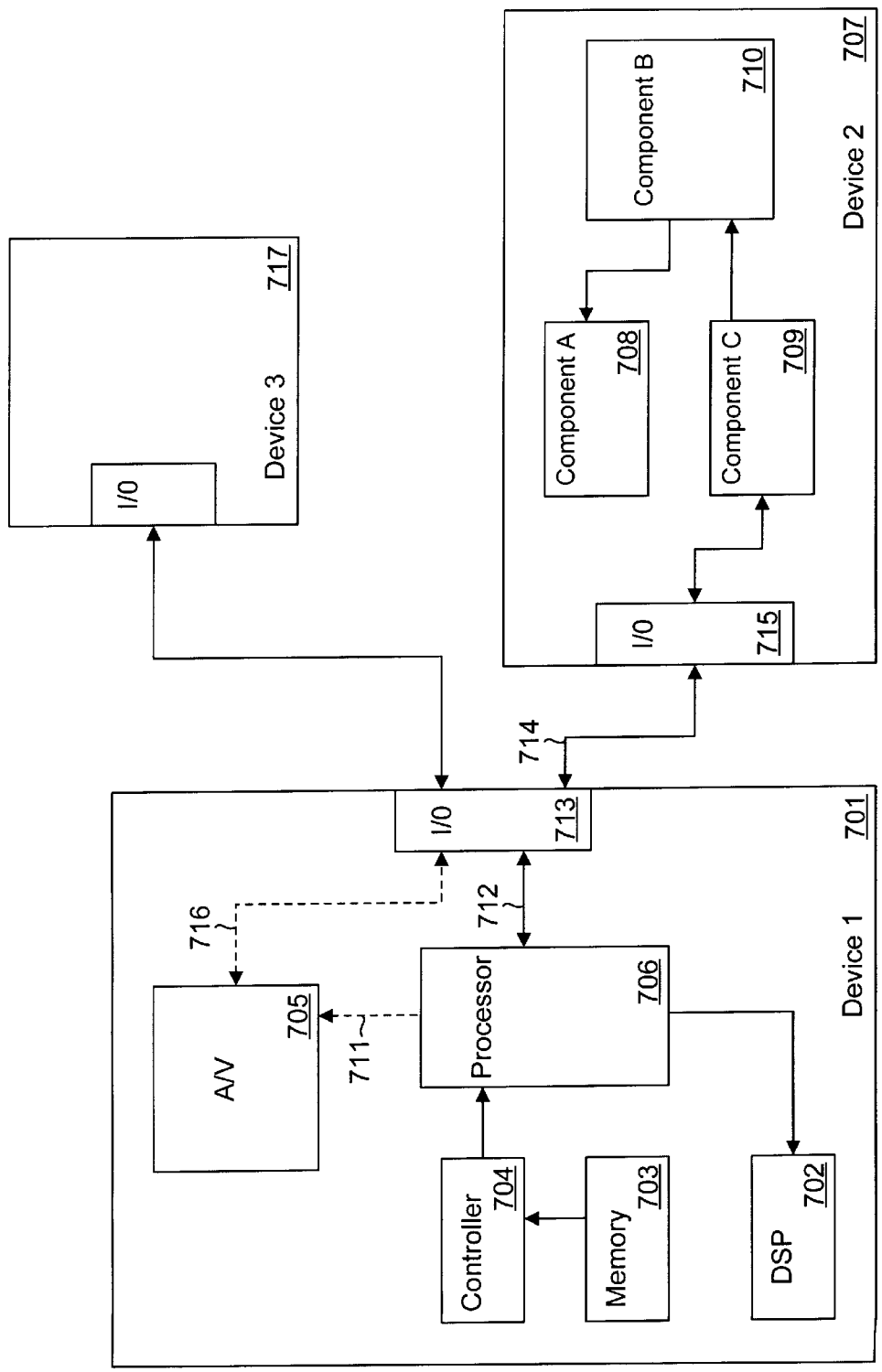
FIG. 7 shows a block diagram of the interconnections between internal components of separate devices coupled to a HAVI network.

FIG. 7 shows a block diagram of the interconnections between internal components of separate devices coupled to a HAVI network. As explained above, a first device 701 can have any number of internal components 702–706 (e.g., amplifier, digital signal processor, memory, I/O interface, controller, transceiver, tuner, graphics accelerator, video/audio compression/decompression engine, etc.). These internal components can be interconnected any number of ways. A second device 707 is shown to be coupled to the HAVI network. Device 707, likewise, contains its own internal components 708–710. These components 708–710 contained within device 707 can be interconnected multiple different ways. Device 707 is coupled to device 701. According to the HAVI architecture described above, device 707 can share resources with device 701. For example, device 707 can advantageously use the functions of component 705 via internal connection 711 to component 706, internal connection 712 to the I/O 713, over link 714 to I/O 715 of device 707. Now, suppose that device 707 is removed from the HAVI network, and that this removal results in connection 711 within device 701 to no longer be necessary. In other words, connection 711 between component 705 and 706 is not necessary because device 707 is no longer using component 705. The significance is that this connection is now available for other purposes. Suppose that device 717 is added to the HAVI network. Device 717 can take advantage of component 705, provided that the proper connection 716 is established. Device 717 can utilize component 705 if connection 716 is made.

There will be instances whereby stale internal connections (i.e., those connections no longer being used) arise in a HAVI network when a user connects or disconnects devices from the network. Further, the process which owns, monitors, or otherwise controls that connection may not be present anymore on the HAVI network. Furthermore, even if the process is present, the process may not be able to affect stale connection so as to drop it. The solution to these problems is to have each DCM within the HAVI network maintain information about the status of internal connections and allow the stream manager(s) to drop connection(s) which it deems to be no longer in use. In the currently preferred embodiment, the status of connections is recomputed on network reset based on messages exchanged among stream managers and DCMs.

Figure 8:
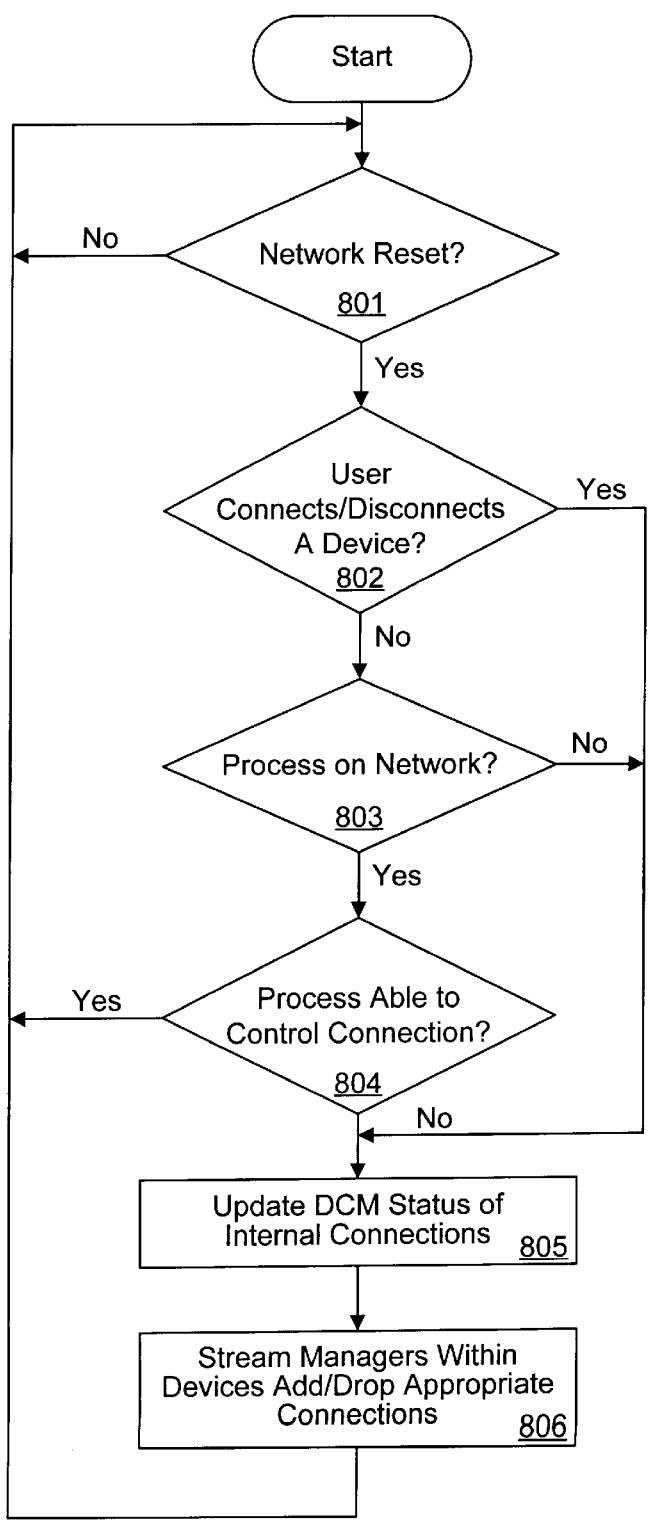
FIG. 8 is a flowchart describing the steps for reconfiguring internal connections.

FIG. 8 is a flowchart describing the steps for reconfiguring internal connections. The HAVI network continues with its normal mode of operation until a network reset is encountered, step 801. In the currently preferred embodiment, a software element application programming interface (API), NetworkReset( ), is used as a local event. This event is generated whenever there is a change in the home network topology (e.g., connection of a new device). A communication media manager (CMM) is generally the component posting this event. The CMM allows other elements to perform asynchronous and isochronous communication over the network. As opposed to the NewDevices and GoneDevices events, the CMM does not gather a global unique identifier (GUID) list of the changed devices. A GUID is a 64-bit quantity used to uniquely identify a device it consists of a 24-bit vendor ID and a 40-bit serial number assigned by the device manufacturer. The GUID is stored in a device's configuration ROM and is persistent over bus resets. The NetworkReset( ) event is intended for target software elements that are only interested in knowing when network topology has changed but are not interested in the specifics of the change.

In step 802, a determination is made as to whether a user has connected or disconnected a device. A newly connected device is indicated by a NewDevices API event. This local event is generated when a new device is connected to the home network. When this happens, a network reset is triggered. The CMM gathers the GUID list of all the newly connected devices and then invokes the Event Manager to post the NewDevices event. The Event Manger serves as an event delivery service. An event is the change in state of an object or of the home network. The GUID list is passed to the Event Manager as additional information of the event. Since each FAV or IAV has its own CMM and all CMM are automatically invoked whenever there is a network reset, the NewDevices event is only delivered locally within the device where the CMM resides. Conversely, a GoneDevices event is generated when devices are disconnected from the home network. When this happens, a network reset is, likewise, triggered. The CMM gathers the GUID list of all the disconnected devices and then invokes the Event Manager to post the GoneDevices event. The GUID list is passed to the Event Manager as additional information of the event. Since the FAV or IAV has its own CMM and all CMM are invoked whenever there is a network reset, the GoneDevices event is only delivered locally within the device where the CMM resides.

Steps 803 and 804 are used to determine whether a process is on the network and whether a process is capable of controlling a connection. If the process is removed; if a process is no longer able to control a connection; or if a device has been added or removed, then step 805 is performed. In step 805, the DCM updates the status of the internal connections. Next, the stream manager(s) within the devices add or drop the appropriate connections, step 806. The stream manager is responsible for managing real-time transfer of AV and other media between functional components. It is capable of constructing a map of all connections within the home network established by HAVI applications.

In the currently preferred embodiment, functional component plugs participate in both internal and external connections. An internal connection involves connecting two plugs from functional components belonging to the same device. An external connection involves first attaching a functional component plug to a device plug (such an attachment is not referred to as a HAVI connection; instead, it is a constituent of a HAVI connection and not directly visible to applications). The following rules apply to connections and attachments within a device:

1. Functional component sink plugs can have at most one connection or attachment (from a functional component source plug or a device sink plug respectively).

2. Functional component source plugs can have many connections to functional component sink plugs and/or attachments to device source plugs.

3. Device source plugs can have only one attachment from a functional component source plug.

4. In general, device sink plugs can have many attachments to functional component sink plugs. It should be noted that the term "plug" refers to a functional component plug. The reference to "source" plugs and "sink" plugs corresponds to output plugs and input plugs. In general, In the currently preferred embodiment, the stream managers establish and break internal connections via DCM::Connect and DCM::Disconnect API commands. The DCM::Connect API establishes an internal connection on the device represented by the DCM between the specifies source plug and the specified destination plug. DCM plugs are numbered starting from zero. The total number of plugs can be obtained via DCM::GetPlugCount. The connect operation is called by the Stream Managers. The DCM::Disconnect API removes an internal connection on the device represented by the DCM. DCM plugs are numbered starting from zero. The total number of plugs can be obtained via DCM::GetPlugCount. The disconnect operation is called by Stream Managers. Stream managers request the DCM to connect, even if the connection already exists. This allows the DCM to "overlay" internal connections and maintain information about the usage of inter connections. After a network reset, the IEC 61883 procedures for restoring connections are invoked by the Stream Manager for each connection (of the IEC61883 transport type) that it has created. During connection restoration, the Stream Manager builds a new list of connections for which it is responsible and may post ConnectionDropped events. This event is posted when: as a result of a network merge, there is insufficient bandwidth available for a connection; as a result of a network partition, the source or sink of a stream has been lost. The Stream Managers also complete IEC 61883 connection restoration during the first one second after network reset (i.e., this is the "isoch_resouce_delay" period specified by IEEE 1394-1995).

Also during this period, Stream Managers indicate to DCMs the internal connections they wish restored by using the DCM::RestbreConnectionList. According to the DCM-:RestoreConnectionList API, DCMs label their internal connections as permanent, non-HAVI, and active-HAVI. A connection may have several labels (e.g., non-HAVI plus active-HAVI). Any, combination is possible. The active-HAVI connections also have a count which is incremented by DCM::Connect and decremented via DCM::Disconnect. If this count goes to zero, the connection is called a stale-HAVI connection. This count must be zero before the connection is actually removed. This allows Stream Managers to "overlay" internal connections. DCMs are responsible for determining when internal connections can be preempted by Stream Managers seeking to use the associated resources. For example, one DCM may only allow Stream Managers to preempt stale-HAVI connections, whereas another may allow preemption of stale-HAVI connections plus non-HAVI connections. Preemption is performed by the Stream Manager issuing a DCM::Disconnect.

It should be noted that in one embodiment, the IDCM: RestoreCornmunicationList API is not used. Instead, E)CMs still label connections as HAVI, non-HAVI, etc. and keep an overlay count. On a network reset, the DCM is notified if any SMGR which has established internal connections (via the DCM::Connect API) is no longer on the network. For such a SMGR, the DCM then updates the labels of the internal connections created by the SMGR. When a SMGR goes through its connection restoration process after a network reset, it requests a DCM to drop an internal connection if the SMGR cannot restore the other links of the connection.

DCMs operate in two modes: "normal" and "restore-in-progress." In the normal mode, the preemptable list in DCM::GetConnectionList will indicate those connections which can be preempted. The DCM::GetConnectionList API provides a list of all internal connections in the device represented by the DCM that are either from or to the plug indicated by a specific address. In the "restorein-progress" mode, preemptable list is empty. The DCDA enters restore-inprogress mode when it detects the NetworkReset event, It returns to normal mode either when it has received DCM-::RestoreConnectionList from all Stream Managers fro which it has created internal connections or one second (the IEEE 1394 1995 "isoc resource delay" period) after entering restore-in-progress mode. When the DCM enters restore-in-progress mode, it char ges all active-HAVI labels to stale-HAVI (i.e., sets the count to zero). When a DCM receives a DCM::RestoreConnectionList, it increments the active-HIAVI count for the connections on the list. When the DCM receives a DCM::Connect (e.g., this will typically be while in normal mode, but is also possible while in restore-in-progress mode), if a new connection is created or an existing connection reused. It will be given an active-HAVI label.

In the currently preferred embodiment, a connection is dropped under the following circumstances:

1. The Stream Manger which created the connection is requested to drop the connection.

2. The owner of the connection leaves (in which case the Stream Manager is notified via the GoneSoftwareElement event).

3. The Stream Manager fails to restore the connection after a network reset.

In summary, the DCM labels all internal connections as either: permanent, non-HAVI, active-HAVI, or stale-HAVI. The DCM also recalls the SEID of the Stream Manager which has created a HAVI connection (active or stale). Combinations are also possible. Some examples include: permanent and non-HAVI, permanent and HAVI (either active or stale), permanent and non-HAVI and HAVI (either active or stale), non-HAVI and HAVI (either active or stale), etc. The DCM::GetConnectionList request returns the list of DCM connections plus a "breakable" list. It includes a "normal" state whereby a connection is breakable if not permanent and not active-HAVI (and, by choice of DCM, not non-HAVI); and a "restore in progress" state whereby the breakable list is null. The DCM::Disconnect will allows a Stream Manager to disconnect connections that it owns or that are breakable. The DCM enters "restore in progress" when a Network Reset event is detected or when it receives a RiestoreConnectionList while in a normal mode. The DCM then labels active-HAVI connections as stale HAVI connections. For a DCM::RestoreConnectionList, the DCM labels all connections on the list as active HAVI connections.

Figure 9:
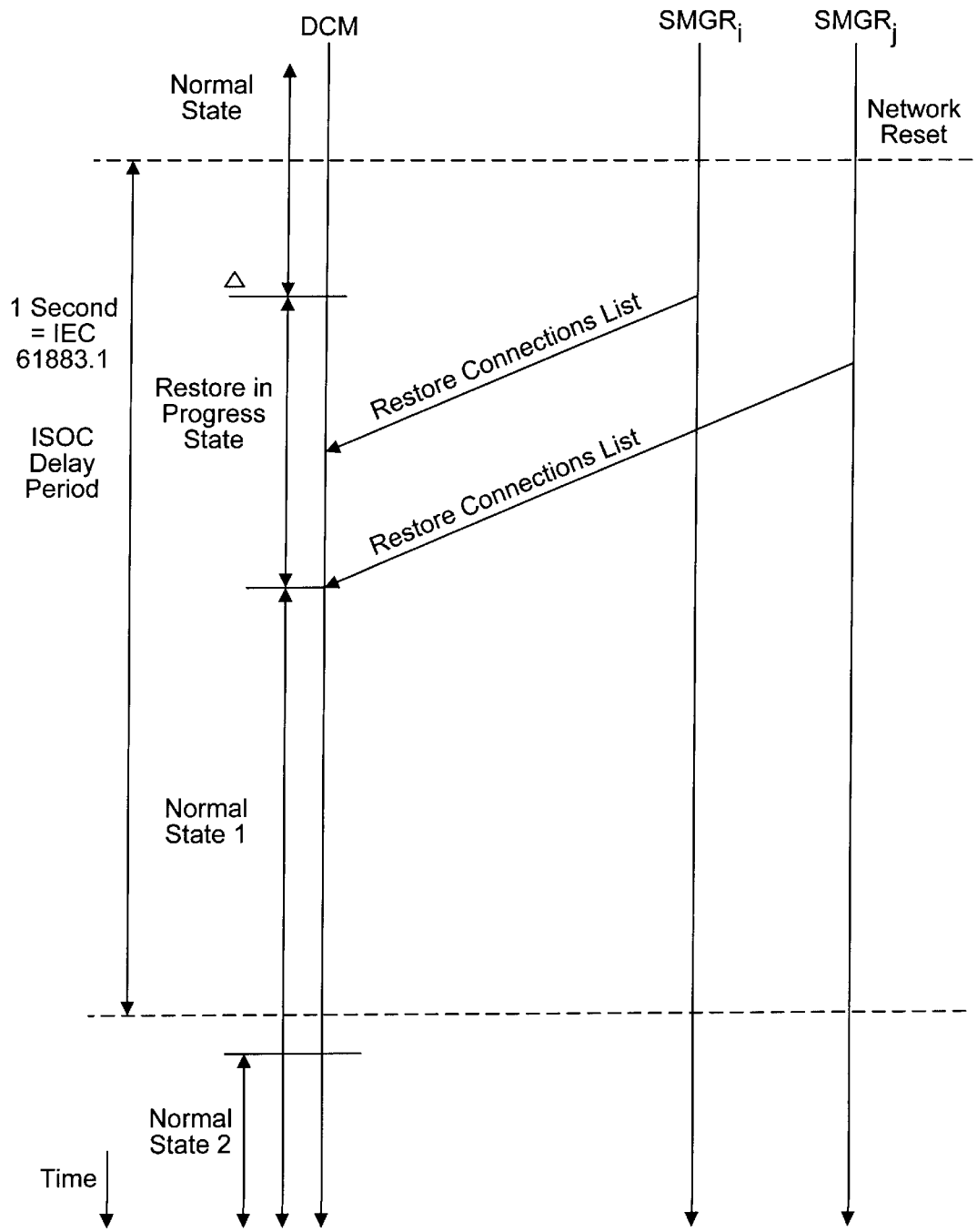
FIG. 9 is a timing diagram of the currently preferred restoration scheme.

FIG. 9 is a timing diagram of the currently preferred restoration scheme. The DCM is in a Normal State until a Network Reset event occurs. At this point, it enters into a RestoreInProgress state. The RestoreCormectionList API is initiated by a first Stream Manager (i). There may be a second or other Stream Manager(s) (j) which also start their respective RestoreConnectionList API calls a short time later. When restoration is complete, the DCM enters back to a Normal State. There are two instances of Normal States which may occur. In a first instance, the DCM returns to a Normal State1 when it has received RestoreConnectionList from every Stream Manager which has created an internal connection (within the DCM). In a second instance, the DCM returns to a Normal State2 after one second has elapsed since it entered into the RestoreInProgress State.

Therefore, an apparatus and method for the restoration of internal connections in a home audio/video system has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a system having a plurality of intercoupled devices transmitting and receiving audio and video data, a method for establishing internal connections between components within the devices, comprising the steps of:

designating for each of the internal connections, a label which identifies whether a particular internal connections is compliant with a specified standard and a status of the particular connection;

detecting a reset condition, wherein the reset condition is initiated when one of the intercoupled devices is removed from the system and the reset condition is also initiated when an additional device is coupled to the system;

reading a list upon detection of the reset condition, wherein the list contains information as to which internal connections within one of the devices can be disconnected;

establishing connections to components according to the list;

dropping connections to components according to the list;

adjusting a count corresponding to an active internal connection when connection is established with that particular active internal connection;

adjusting the count corresponding to the active internal connection when connection has been dropped;

updating the status of the devices.

2. The method of claim 1 further comprising the step of returning to a normal mode of operation after all internal connections have been restored.

3. The method of claim 1 further comprising the step of returning to a normal mode of operation one second after the reset condition has been initiated.

4. The method of claim 1, wherein the status includes permanent, non-permanent, active, stale, compliant, and non-compliant connections.

5. The method of claim 4, wherein the status includes combinations of permanent, non-permanent, active, stale, compliant, and non-compliant connections.

6. The method of claim 1 further comprising the step of overlaying a plurality of connections to a same plug of one component.

7. The method of claim 6 further comprising the steps of removing the active internal connection when the count corresponding to the active internal connection has reached zero and changing the status of that particular connection to inactive.

8. A computer-readable medium having stored thereon:
a device control module which labels internal connections of a device coupled to a home audio/visual network and specifies whether an internal connection can be disconnected based on whether the internal connection is compliant and whether the internal connection is active;

a detector which detects a reset condition, wherein the reset condition is initiated when one of a plurality of intercoupled devices is removed from the home audio/visual network and the reset condition is also initiated when an additional device is coupled to the home audio/visual network;

a list specifying which internal connections within one of said plurality of intercoupled devices can be disconnected;

a stream manager which establishes internal connections and drops internal connections according to the list;

a counter corresponding to an active internal connection which adjusts a count when connection is established with that particular active internal connection and when connection has been dropped to that particular active internal connection.

9. The computer readable medium of claim 8, wherein the device control module further initiates a network reset whenever one of the devices is removed from or added to the home audio/visual network as indicated by the stream manager.

10. The computer readable medium of claim 9, wherein the device control module updates the data after the network reset.

11. The computer readable medium of claim 9, wherein the device control module returns to a normal mode of operation after all internal connections have been restored.

12. The computer readable medium of claim 9, wherein the device control module returns to a normal mode of operation one second after the reset condition has been initiated.

13. The computer readable medium of claim 9 further including an application program interface which retrieves a list of internal connections from or to a plug.

14. The computer readable medium of claim 13, wherein the list also indicates which of the connections are preemptible.

15. The computer readable medium of claim 9 further including application program interfaces for connecting and disconnecting internal connections.

16. A home audio/visual system having a plurality of devices coupled to a network so that data including audio and video streams can be transmitted from one of the devices to another of the devices over the network, comprising:
a plurality of electronic devices containing internal components which have one or more plugs that can be connected to one of several plugs belonging to a separate internal component;

a processor residing within one of the electronic devices which designates for each of a plurality of internal connections, whether a particular internal connections is compliant with a specified standard and a status of the particular connection so that upon detection of a network reset, the processor reads a list to determine which of the internal connections may be disconnected;

a counter corresponding to an active internal connection which adjusts a count when connection is established with that particular active internal connection and when connection has been dropped to that particular active internal connection;

a memory coupled to the processor for storing information pertaining to a status and condition of each of the internal connections, wherein the information is updated according to the counter.

17. The system of claim 16, wherein the status includes combinations of permanent, non-permanent, active, stale, compliant, and non-compliant connections.

* * * * *